United States Patent
Ikeda et al.

[19]

[11] Patent Number: 5,842,337
[45] Date of Patent: Dec. 1, 1998

[54] ROTOR FOR OPEN-END SPINNING MACHINE

[75] Inventors: Masatoshi Ikeda; Hironori Inoue; Takafumi Turumaru, all of Kagoshima, Japan; Zenpei Tachibana, Kyoto, Japan

[73] Assignee: Kyocera Corporation, Kyoto, Japan

[21] Appl. No.: 718,821

[22] Filed: Sep. 24, 1996

[30] Foreign Application Priority Data

Sep. 29, 1995 [JP] Japan ..................... 7-254051

[51] Int. Cl.⁶ ......................................... D01H 4/00
[52] U.S. Cl. ............................... 57/414; 57/416
[58] Field of Search .............. 57/406, 414, 415, 57/416, 417

[56] References Cited

U.S. PATENT DOCUMENTS

| | | | |
|---|---|---|---|
| 4,242,858 | 1/1981 | Dschen | 57/415 |
| 4,358,922 | 11/1982 | Feldstein | 57/414 |
| 4,492,077 | 1/1985 | Raasch et al. | 57/416 X |
| 4,662,170 | 5/1987 | Raasch | 57/416 |
| 4,777,813 | 10/1988 | Hoffmann et al. | 57/416 X |
| 4,848,080 | 7/1989 | Hofmann et al. | 57/414 X |
| 4,866,927 | 9/1989 | Fetzer et al. | 57/414 |
| 5,326,009 | 7/1994 | Kobayashi et al. | 57/350 X |
| 5,499,911 | 3/1996 | Nakata et al. | 57/332 X |

*Primary Examiner*—William Stryjewski
*Attorney, Agent, or Firm*—Loeb & Loeb LLP

[57] ABSTRACT

A rotor for an open-end spinning machine. A spinning portion of a bottomed cylindrical body has a hollow portion where twisted yarn is formed by a continuous twisting operation while gathering short fiber groups in the maximum diameter portion of the spinning chamber. A rotary shaft is joined to the spinning portion. The spinning portion is made of a silicon nitride sintered body which includes no less than 60% silicon nitride grain having an aspect ratio not less than 3, and an average grain size of from 0.1 to 10 $\mu$m. The rotor is hardly damaged at a high speed rotation of 100,000 r.p.m. or more, and the yarn strength and the yarn quality are not reduced even after an extended use of the rotor for a long time.

11 Claims, 4 Drawing Sheets

ROTOR FOR OPEN-END SPINNING MACHINE

BACKGROUND OF THE INVENTION

The present invention relates to a rotor for an open-end spinning machine, and in particular to a rotor for an open-end spinning machine to be used for forming twisted yarn through a continuous twisting operation while focussing a short fiber group.

Figure 1:
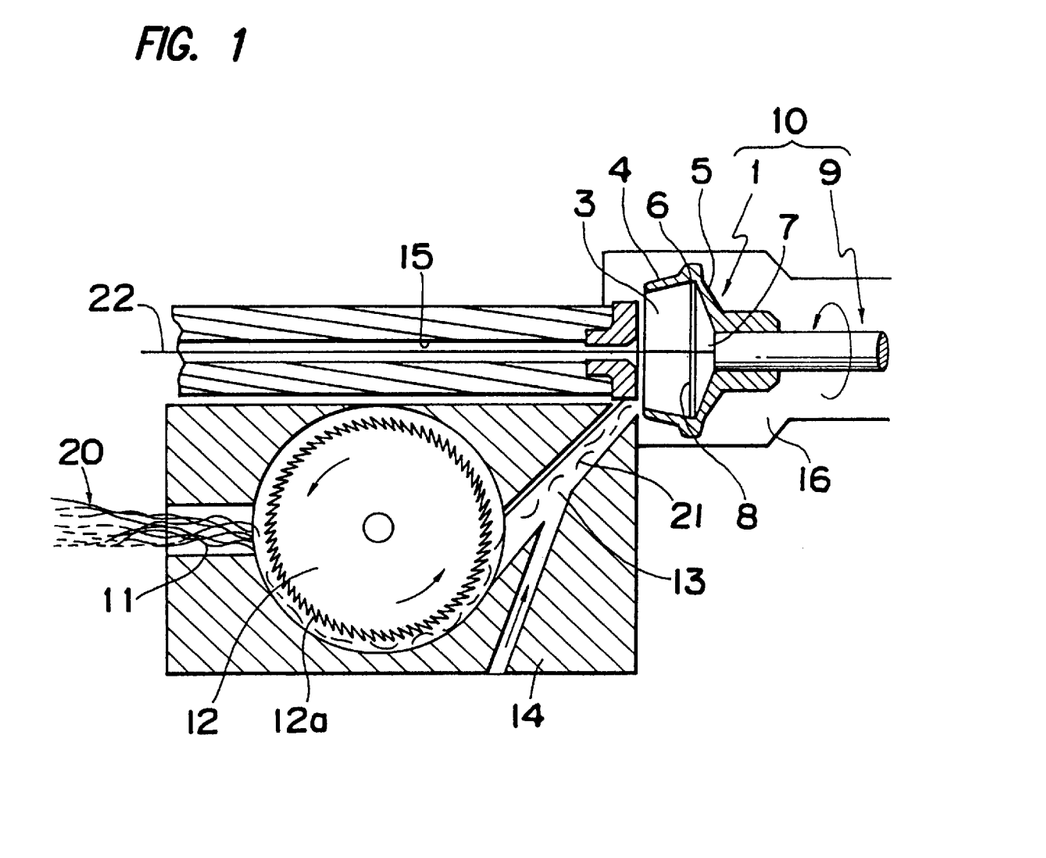
FIG. 1 is a schematic view showing an open-end spinning machine with a rotor of the present invention being built in therein.

As shown, for example, in FIG. 1, conventional open-end spinning machines are adapted to transport to a combing roller 12 to be rotated within a spinning yarn unit 14 slivers 20 fed to the supply opening 11 of the spinning yarn unit 14. Fibers of the slivers 20 are opened with saw shaped cutting edges 12a provided on the outer periphery of the combing roller 12, so that short fiber groups 21 may be fed to a spinning chamber 3 of a rotor 10 rotating at high speeds in a negative chamber 16 through the transport hole 13.

The short fiber group 21 fed to the spinning chamber 3 of the rotor 10 is focussed toward the maximum diameter portion 6 of the spinning chamber 3 in turning air currents and is twisted continuously into twisted yarn 22. The twisted yarn 22 may be pulled out from a yarn guiding hole 15 arranged in the opening portion of the rotor 10.

The spinning portion 1 of the rotor 10 is composed of a bottomed cylindrical body 2 having taper-shaped upper, lower inner wall faces 4, 5, a maximum diameter portion 6 provided with groove 8 near the crossing portion of the inner wall faces 4, 5, and a bottom face 7. The whole rotor 10 composed of the spinning portion 1 and a rotary shaft 9 is made of aluminum alloy, which is superior in working property and lower in specific gravity.

However, a rotor 10 made of aluminum alloy has problems. The abrasion of the maximum diameter portion 6 reduces the quality of the yarn in a short period of time, because the abrasion of the maximum diameter portion 6 is violent due to the sliding motion against the short fiber group 21, and the collision with leaf waste or fruit waste that is mixed with the short fiber group 21, with sand and dust in the air, and so on.

There is a problem in that the rotation speed, which used to be approximately 30,000 r.p.m. in the conventional rotor 10, is now required to be 100,000 r.p.m or higher accompanied by improvements in the yarn production speed. When a rotor 10 made of aluminum alloy is rotated at such a high rotating speed, the rotor is incapable of resisting stresses generated by the rotation so that the spinning portion 1 is deformed.

To improve the abrasion resistant property and the strength of the rotor 10, the spinning portion 1 of the rotor 10 was made of an iron type alloy with ceramic coating or diamond coating on the surface of the spinning chamber 3, as described in Japanese Laid-Open Patent Application No. SHO 55-116825.

However, rotation at high speeds of 100,000 r.p.m. or more was very difficult to achieve, because the specific gravity was as large as 8 g/cm$^3$ in the rotor 10 that is provided with the spinning portion made of an iron type alloy.

Since ceramic film and diamond film were coated on the maximum diameter portion 6 of the spinning chamber 3, the quality of the initial yarn was better. However, the longer period of use could not be endured, because the thin ceramic film and the diamond film were worn away in a short period of time, thereby considerably reducing the quality of the yarn due to the sliding and the collision with the short fiber group 21, leaf waste, seed waste, sand, dust and so on, thus being incapable of longer period of use.

If the ceramic coating or the diamond coating was made thicker to improve the service life of the maximum diameter portion 6, there was a possibility of separation, because the adherence strength of either of the coatings with the iron type alloy as a basic body was insufficient, so that a satisfactory rotor 10 could not be obtained.

Recently, the formation of a spinning portion 1 of the rotor 10 was proposed with the use of ceramic, such as an alumina sintered body, a silicon carbide sintered body, a nitride silicon sintered body and so on, which were smaller in specific gravity, higher in hardness in terms of rigidity property, and could be worked into greater size accuracy (see Japanese Laid-Open Patent Application No. SHO 60-146020).

But even in a rotor 10 having a spinning portion 1 made of ceramic, a rotor 10 could not be obtained for practical use, because there was a possibility of being broken due to the high speed rotation at 100,000 r.p.m. or more and of lower reliability.

According to the observation about the breakdown principle of the spinning portion 1 composed of ceramic, it was discovered that the spinning yarn portion broke because of reduction in mechanical strength. It was because grain breaks were caused due to the sliding motion with the short fiber group 21, and the collision with leaf waste, fruit waste, sand, dust and so on, since the broken grains were collided with other grains to promote the grain breaking, or cracks were formed due to the grain breaks. The cracks progressed with stresses accompanied by the rotation.

The present inventors have perceived a nitride silicon sintered body which is superior in abrasion resistant properties, higher in strength and tenacity, and smaller in specific gravity from among the ceramics. The researchers have repeated tests on the nitride silicon sintered body which is optimum for the construction of the spinning portion 1. They have found that, when the average grain diameter of the nitride silicon grain is within a constant range, the needle-shaped or the pillar-shaped nitride silicon grain has sufficient strength and tenacity, and that, when the nitride silicon sintered body having the average grain diameter in a constant range is used, durability property is improved because broken grains are less in the maximum diameter portion.

According to the present invention, a rotor substantially does not cause reduction in the yarn strength and the reduction in the yarn quality even in the long period of use of the rotor, because the high speed rotation of 100,000 r.p.m or more does not damage the rotor, or the surface of the maximum diameter portion was hard to be roughened. In the present invention, the spinning portion is made of a nitride silicon sintered body including nitride silicon grains with not less than about 60% of the nitride silicon grains having an aspect ratio of 3 or more, with the average crystal grain diameter being 0.1 through 10 μm in the spinning portion.

Also, in the present invention, the central line average roughness (Ra) of or lower.

Further, in the present invention, the maximum unbalance amount of the rotor is made 0.15 mgm or lower.

BRIEF DESCRIPTION OF THE DRAWINGS

FIGS. 5(a)–5(d) are enlarged views showing the crystal construction of various ceramics for composing the spinning portion, in which FIG. 5(a) shows a nitride silicon sintered body of the present invention, FIG. 5(b) shows an alumina sintered body, FIG. 5(c) shows a nitride carbide sintered body, and FIG. 5(d) is a nitride silicon sintered body having properties outside the range of the present invention.

DESCRIPTION OF THE PREFERRED EMBODIMENTS

The embodiments of the present invention will be described hereinafter.

Figure 2:
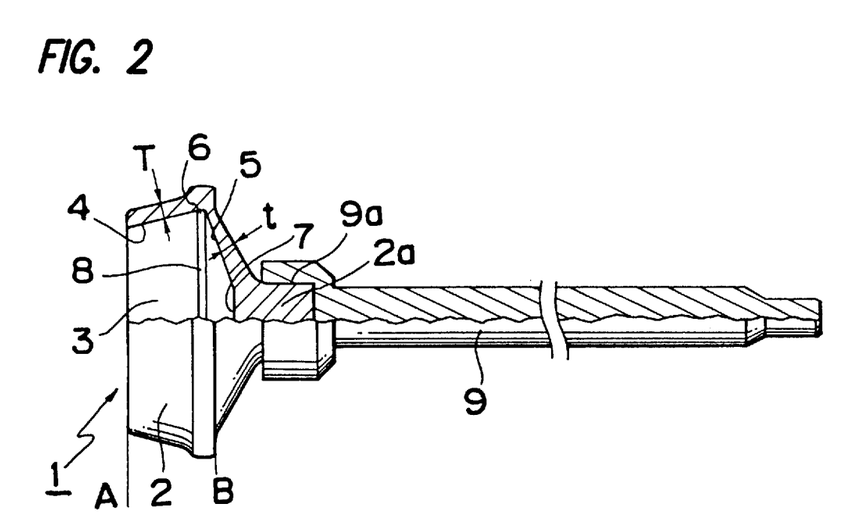
FIG. 2 is a front view of a rotor for an open-end spinning machine of the present invention is broken with one portion thereof being broken.

FIG. 1 is a schematic view showing an open-end spinning machine provided with a rotor 10 in accordance with the present invention. FIG. 2 is a front view of a rotor for the open-end spinning machine of the present invention with one portion thereof being broken.

As shown in FIG. 1, the open-end spinning machine is composed of a feeding opening 11 for supplying slivers 20, a transporting hole 13 for transporting a group of short fibers 21 whose fibers are opened, and a spinning yarn unit 14 provided with a yarn guiding hole 15 for guiding twisted yarn 22, a combing roller 12, which is disposed within the spinning yarn unit 14, provided with saw shaped cutting edges 12a on outer periphery, a negative pressure chamber 16 for guiding through the transporting hole 13 to the rotor 10 a group of short fibers 21 opened by the combing roller 12, and a rotor 10. The rotor 10 is composed of a spinning portion 1 and a rotary shaft 9. The spinning portion 1 is disposed in the negative pressure chamber 16 and has a spinning chamber 3 for forming twisted yarn 22 by continuous twisting of the short fibers 21 fed in the spinning chamber 3, and a rotary shaft 9 for rotating through a driving belt (not shown) of the spin portion 1.

To form twisted yarn 22 by the open-end spinning machine, the slivers 20 are fed into the feeding opening 11 of the spinning yarn unit 14, the fibers of the slivers 20 are opened with the saw shaped cutting edges 12a of the combing roller 12 rotating within the spinning yarn unit 14 to generate groups of short fibers 21, and the groups of short fibers 21 are fed into the spinning chamber 3 of the rotor 10 to be rotated at high speeds within the negative pressure chamber 16 through the transporting hole 13.

The groups of short fibers 21 fed into the spinning chamber 3 are focussed into a maximum diameter portion 6 along the upper portion inner wall face 4 of the spinning chamber 3 by turning air currents. The twisted yarn 22 is formed by continuous twisting at the maximum diameter portion 6. The obtained twisted yarn 22 is taken out from the yarn guiding hole 15 arranged in the opening portion of the spinning chamber 3.

Then, the rotor 10 of the open-end spinning machine will be described below in detail.

As shown in FIG. 2, the spinning portion 1 of the rotor 10 for forming the twisted yarn 22 is composed of a bottomed cylindrical body 2 with a hollow portion defining a spinning chamber 3. The bottomed cylindrical body 2 is made of a nitride silicon sintered body. The spinning chamber 3 is composed of tapered upper and lower inner wall faces 4 and 5 and a maximum diameter portion 6 formed near a border portion between the upper and lower inner wall faces 4 and 5 and a bottom face 7. Groove 8 is notched in the maximum diameter potion 6. The short fiber group 21 is twisted near the opening portion of groove 8. Leaf wastes, fruit wastes, sand or dust and so on are retained within grooves 8 so that they may not be mixed with the twisted yarn 22.

Also, as grooves 8 and the upper inner wall faces 4 and 5 defining the maximum diameter portion 6 of the spinning chamber 3 has surface roughness of 1 $\mu$m or lower in the central line average roughness (Ra), yarn formed by the present invention is comparable to those formed by the conventional metallic rotor. As a result, yarn having higher yarn strength can be made.

A boss 2a projects from the lower portion of the bottomed cylindrical body 2. The metallic rotary shaft 9 is spliced by a shrinkage-fit operation into the boss 2a to form the rotor 10.

The whole spinning portion 1 is formed from a nitride silicon sintered body having fracture toughness ($K_{1c}$) of 6 MPam$^{1/2}$ or more with bending strength being 60 kgf/mm$^2$ or more, preferably, fracture toughness ($K_{1c}$) of 6.5 MPam$^{1/2}$ or more with bending strength being 80 kgf/mm$^2$ more. As a result, the spinning yarn portion endures the high speed rotation of 100,000 r.p.m. or more.

The spinning portion cannot endure the high speed rotation of 100,000 r.p.m. or more when the bending strength of the sintered body is under 60 kgf/mm$^2$ or lower. The spinning portion fails near the upper portion inner wall face 4 of the spinning yarn portion 1 where the maximum stress is generated. Cracks are even formed in the spinning portion 1 due to grain breaking that is caused by the sliding motion of the spinning portion against the short fiber groups 21 and the collision of leaf waste, seed waste, sand, dust and so on in the maximum diameter portion 6 if sufficient bending strength is provided, but the fracture toughness ($K_{1c}$) is less than 6 MPam$^{1/2}$. The cracks progress in a short period of time by the stresses accompanied by the high speed rotation, and eventually destroys the spinning portion 1.

Thus, when the spinning portion 1 is composed of a nitride silicon sintered body having the above described characteristics, the whole spinning portion 1 can be made lighter in weight without damages if the thickness T of the bottomed cylindrical body 2 including the upper inner wall face 4 where the maximum stress is caused is made thinner than the thickness t of the bottomed cylindrical body 2 including the lower portion inner wall face 5. Since the density of the nitride silicon sintered body is especially small among ceramics, which is as small as approximately 3.3 g/cm$^3$, the high speed rotation can be effected with small rotation torque, thus providing the higher performance of the rotor 10.

To obtain the nitride silicon sintered body of such characteristics, it is required to form the nitride silicon sintered body including nitride silicon grains with not less than 60%, and preferably, 75% or more of the nitride silicon grains having an aspect ratio of 3 or more with the average crystal grain size being 0.1 through 10 $\mu$m.

When the average crystal grain diameter of the nitride silicon grain for composing the sintered body is greater than 10 $\mu$m, the fracture toughness ($K_{1c}$) and the bending strength of the nitride silicon sintered body are considerably lowered, and the grain breaks are likely to occur in the maximum diameter portion 6 to form holes. The twisted yarn 22 is damaged with edges of the holes. On the other hand, it is difficult in manufacturing to obtain the average crystal grain size of 0.1 μm or lower.

Also, when the content of the nitride silicon grains having an aspect ratio of 3 or more is 60% or lower, the fracture toughness ($K_{1c}$) and the bending strength are considerably lowered, and the grain pull-off is likely to occur because of existence of many spherical silicon nitride grains in the maximum diameter portion 6.

The composition of the nitride silicon sintered body provides better results if rare earth oxide such as $Y_2O_3$, $Yb_2O_3$ or the like is included in the range of 2 through 5% by weight, and $Al_2O_3$ is included in the range of 2 through 5% by weight as another assistant with respect to the $Si_3N_4$ of 90 through 96% by weight.

Also, the measurement of the average crystal grain size, the aspect ratio and the composition of the sintered body can be obtained by analyzing a 3000-time magnified SEM photograph of the break face of the material taken by the SEM (Scanning Electron Microscope) with the use of an image analyzing apparatus (Luzex). The aspect ratio is generally expressed by a ratio between the long side and the short side of one grain. However, in the present measurement, a long side and a short side of each grain are determined, using the sectional image of the grain seen in the break face, and the ratio between the long side and the short side is measured as the aspect ratio.

Further, to stably rotate the rotor 10 with high speeds, the maximum unbalance is required to be 0.15 mgm or lower.

The rotor 10 is rotated by a driving belt (not shown). However, the rotor 10 is likely to jump by centrifugal force generated by the unbalance amount of the rotor 10 when the unbalance amount of the rotor 10 becomes excessive for the light weight spinning portion 1 made of the nitride silicon sintered body. As a result, heat is generated through belt slip by momentary separation of the driving belt from the rotor 10 or through the induction of solid inner friction within the belt, coupled with the poor radiation property of the nitride silicon sintered body of the spinning portion 1 which has a thermal conductivity of approximately 0.05 cal/s.om.°C. As a consequence, the temperature of the rotor 10 becomes 100° C. or higher so that melting abrasion of the driving belt and the strength deterioration of the rotary shaft 9 are caused. Further, there is a possibility of damaging the spinning yarn portion 1 by the collision against the wall face of the negative chamber 16 when the rotor 10 jumps in a large amount.

This is because the spinning portion 1 is formed from a nitride silicon sintered body which is light in weight and does not have good radiation property. The rotation of the rotor 10 can be made stable when the maximum unbalance amount of the rotor 10 is 0.15 mgm or lower, and the temperature of the rotor 10 by the frictional heat with the driving belt can be controlled to 80° C. or lower. As a result, the melting abrasion of the driving belt and the strength deterioration of the rotary shaft 9 can be prevented.

To manufacture the spinning portion 1 made of such a nitride silicon sintered body, first, rare earth oxide such as $Y_2O_3$, $Yb_2O_3$ or the like having a portion ranging from 2 through 5% by weight, and $Al_2O_3$ having a portion ranging from 2 through 5% by weight as another assistant are respectively added to the $Si_3N_4$ powder having a portion ranging from 90 through 96% by weight and an average grain size of approximately 2.5 μm as major material. Binder and solvent are added to these materials, mixed and crushed by a rotary mill. The crushed materials are formed into granulated bodies by a spray drier. Then, the granulated bodies are filled in a metallic mold to form a cylindrical molding by a cool hydrostatic pressure method. Then, a cutting operation is performed upon the obtained molding to form a bottomed cylindrical body 2 shown in FIG. 1. Then, the molding of the bottomed cylindrical body 2 is removed in grease under vacuum, and burned at burning temperatures of approximately 1750° through 1850° C. A grinding operation is performed upon sink grooves 8 and upper and lower inner wall faces 4, 5 so that the maximum diameter portion 6 of the bottomed cylindrical body 2 thus obtained has the central line average roughness (Ra) 1 μm or lower to obtain a spinning portion 1 of the present invention.

Also, according to the measurement of the nitride silicon sintered body formed in a manner described above, the main phase is composed of $\beta$-$Si_3N_4$, with the average crystal grain diameter of nitride silicon grain being 0.1 through 10 μm Not less than 60% of the nitride silicon grains has an aspect ratio of 3 or more, with the density being 3.1 through 3.3 g/cm$^3$, the breakdown tenacity value ($K_{1c}$) being 6 MPam$^{1/2}$ or more, and the bending strength being 60 kgf/mm$^2$ or more.

Figure 3:
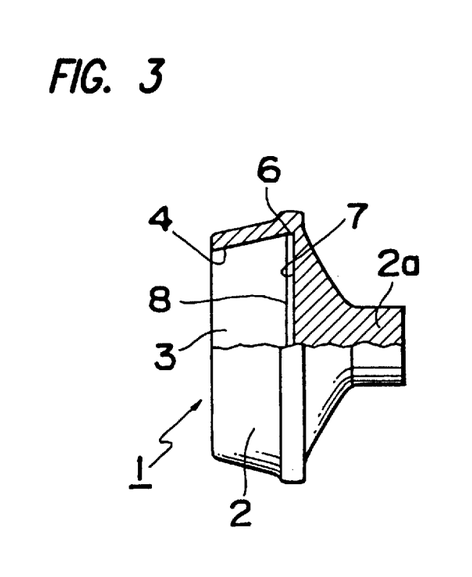
FIG. 3 is a front view of another spinning portion of the rotor for an open-end spinning machine of the present invention with one portion thereof being broken.
Figure 4:
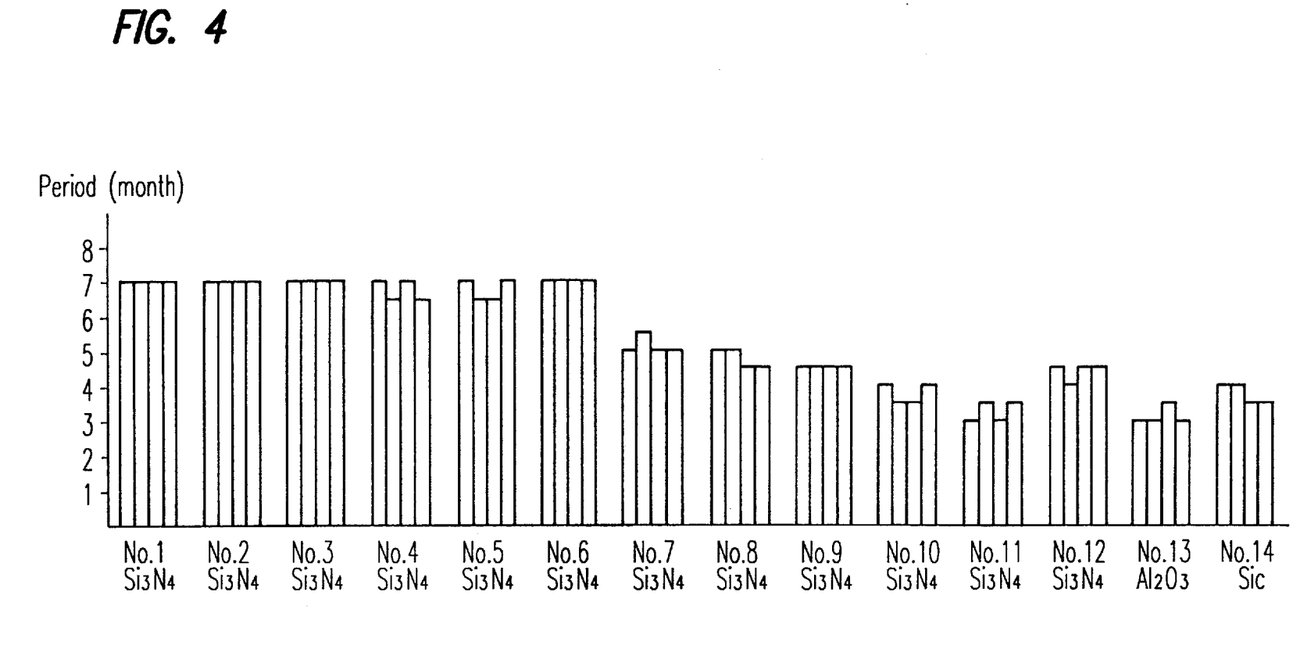
FIG. 4 is a graph showing durability of a spin portion composed of various types of ceramics.

The shape of the spinning portion 1 of a rotor 10 is not restricted to the one shown in FIG. 2. However, a variety of other shapes are applicable to the spinning portion 1, having a bottomed cylindrical body 2 in which a spinning chamber 3 shown in, for example, FIG. 3 is composed of an upper inner wall face 4 and a bottom face 7, a maximum diameter portion 6 provided with grooves 8 near the border portion between the upper portion inner wall face 4 and the bottom face 7.

EMBODIMENT 1

Durability of a spinning portion 1 of a rotor 10 was measured after assembling the rotor 10 into the open-end spinning machine. Four groups of rotors 10 were prepared for trial. In the first group, each spinning portion 1 is made of a nitride silicon sintered body of the present invention. In the other groups, each spinning portion 1 is respectively made of an alumina sintered body, a silicon carbide sintered body, and a nitride silicon sintered body having properties out of the range of the present invention, as a comparison example.

Each of the respective rotors 10 has the surface roughness of approximately 0.8 μm in the central line average roughness (Ra) in the maximum diameter portion 6 of the spinning chamber 3, with a rotary shaft 9 composed of chromium steel being shrink-fit into the boss 2 of the spinning portion 1. A shrink-fit amount of approximately 130 μm at 300° C. was used.

Also, the durability of the spinning portion 1 was tested based on the strength of twisted yarn 22 that is formed with the rotor 10 being rotated at a rotating speed of approximately 60,000 r.p.m with 100% cotton being used for yarn, low count yarn of spinning count 10$^3$. The service life was judged when the yarn strength (pulling strength of the yarn) became 600 (g) or lower which is the base yarn strength of twisted yarn 22 obtained by the conventional metallic rotor 10. This yarn strength is used as an evaluation standard of the present experiment.

The characteristics of materials for composing the spinning portion 1 of each rotor are shown respectively in Table 4 below.

TABLE 1

| No. | Material Quality | Content of Major Component (% by weight) | Average Crystal Grain Diameter ($\mu$m) | Content Factor (%) of Grain of 3 or more in Aspect Ratio | Breakdown Tenacity Value (MPam$^{1/2}$) | Bending Strength (kgf/mm$^2$) |
|---|---|---|---|---|---|---|
| 1 | $Si_3N_4$ | $Si_3N_4$/91 | 6 | 80 | 6.5 | 80–90 |
| 2 | $Si_3N_4$ | $Si_3N_4$/91 | 4 | 70 | 6.0 | 60 |
| 3 | $Si_3N_4$ | $Si_3N_4$/90 | 6 | 65 | 6.0 | 65 |
| 4 | $Si_3N_4$ | $Si_3N_4$/90 | 8 | 60 | 6.0 | 60 |
| 5 | $Si_3N_4$ | $Si_3N_4$/90 | 10 | 65 | 6.0 | 60 |
| 6 | $Si_3N_4$ | $Si_3N_4$/95 | 4 | 60 | 6.0 | 80 |
| *7 | $Si_3N_4$ | $Si_3N_4$/94 | 3 | 50 | 5.5 | 70 |
| *8 | $Si_3N_4$ | $Si_3N_4$/90 | 10 | 55 | 5.0 | 55 |
| *9 | $Si_3N_4$ | $Si_3N_4$/90 | 15 | 70 | 6.0 | 45 |
| *10 | $Si_3N_4$ | $Si_3N_4$/90 | 20 | 70 | 5.5 | 40 |
| *11 | $Si_3N_4$ | $Si_3N_4$/90 | 8 | 45 | 4.5 | 60 |
| *12 | $Si_3N_4$ | $Si_3N_4$/88 | 18 | 75 | 5.8 | 50 |
| *13 | $Al_2O_3$ | $Al_2O_3$/99.5 | 10 | — | 4.0 | 33 |
| *14 | SiC | SiC/95 | 4 | — | 3.4 | 50 |

*out of the range of the present invention

As a result, a rotor 10 formed from an alumina sintered body and a silicon carbide sintered body (No. 13 and 14 specimens) resulted in the time failure in approximately four months.

Also, a rotor 10 composed of a nitride silicon sintered body (No. 7, 8 and 11 specimens) resulted in the service life reduction corresponding to 600 (g) or lower in yarn strength after 5.5 months, although the result was generally good, because the breakdown tenacity value ($K_{1c}$) of the sintered body was as small as 6 MPam$^{1/2}$ or lower because the amount of the nitride silicon grains having an aspect ratio of 3 or more was 60% or lower.

Further a rotor 10 composed of a nitride silicon sintered body (No. 9, 10 and 12) resulted in the service life reduction and the reduction in yarn strength after 4.5 months, although the result was generally good, because the bending strength of the sintered body was as small as 60 kgf/mm$^2$ or lower because the average crystal grain diameter of the nitride silicon grain was 10 $\mu$m or greater.

On the other hand, since a rotor 10 composed of a nitride silicon sintered body (Nos. 1 through 6 specimens of the present invention) was within the range in which the average crystal grain diameter of the nitride silicon grain is 0.1 through 10 $\mu$m, and not less than 60% of the nitride silicon grains has an aspect ratio of 3 or more. The fracture toughness ($K_{1c}$) of 6 MPam$^{1/2}$ or more and the bending strength of 60 kgf/m$^2$ are obtained, and as a result, the service life is extended, and reduction in the yarn strength to 600 (g) did not occur even after the use of 6 months or longer.

The maximum diameter portion 6 of each rotor 10, which is an important portion in forming the twisted yarn 22, was observed. As shown in FIG. 5(b), in the alumina sintered body of No. 13 specimen, large cave portions were formed when the grain breaks occurred because the average grain size of the alumina grain was as large as 10 $\mu$m, and the grain pull-off was promoted acceleratedly while repeating the collision of the broken alumina grains against other alumina grains. The resultant roughened surface damaged the twisted yarn and lowered the yarn strength.

Figure 5A:
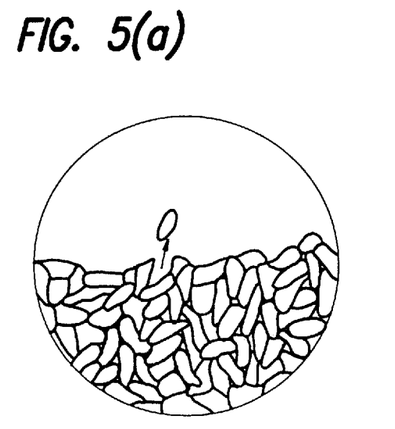
Figure 5B:
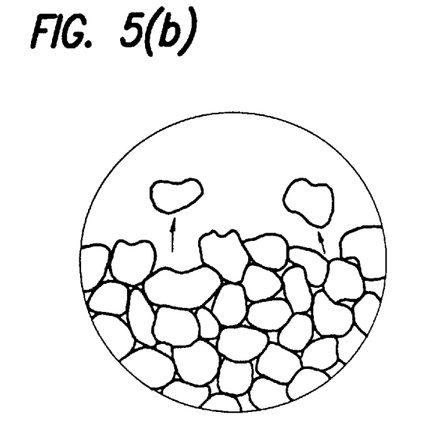
Figure 5C:
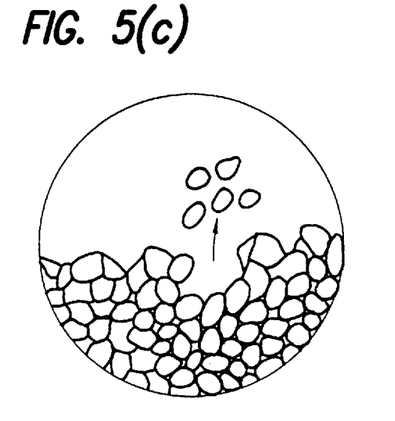

Also, in a rotor 10 composed of the silicon carbide sintered body of No. 14 specimen, as shown in FIG. 5(c), the maximum diameter portion 6 developed cracks on its surface, and the surface of the maximum diameter portion 6 collected leaf waste, fruit waste, sand, dust or the like, although the average crystal grain size of the silicon carbide grain was as small as approximately 4 $\mu$m. This is because the fracture toughness ($K_{1c}$) of the sintered body itself was as small as 3.4 MPam$^{1/2}$. As a result, the twisted yarn 22 is damaged by the roughened surface of the maximum diameter portion, which resulted in a reduction in yarn strength.

Figure 5D:
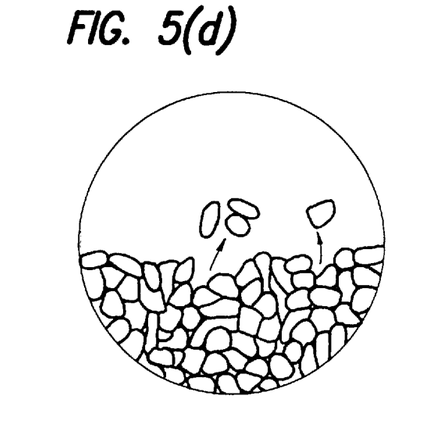

Further, in the nitride silicon sintered body of No. 7, 8 and 11 specimens, the nitride silicon grain having an aspect ratio of 3 or more is 60% or lower as shown in FIG. 5(d), many nitride silicon grains each being almost spherical in shape existed on the surface. When some grains fell, adjacent nitride silicon grains are likely to be broken together with the fallen grains. As a result, it was observed that the reduction in the yarn strength became faster with rougher surface of the maximum diameter portion 6.

On the other hand, since the nitride silicon sintered body of the present invention of No. 1 through 6 specimens include not less than 60% nitride silicon grains having an aspect ratio of 3 or more, as shown in FIG. 5(a), many needle-shaped or pillar-shaped nitride silicon grains existed. Therefore, adjacent nitride silicon grains penetrate deeply. Consequently, even when some nitride silicon grains are broken, grain pull-off is hard to occur. It was observed that the yarn strength was not reduced even in the longer period of use because of the reduced surface roughness in the maximum diameter portion 6.

Further, tests were conducted to determine as to whether or not a rotor 10 shown in Table 1 could endure the rotating speed of 100,000 r.p.m. which is lately demanded. In the rotor 10 in which the spinning portion 1 is composed of an alumina sintered body and a silicon carbide sintered body (Nos. 13 and 14 specimens, respectively), the spinning portion 1 was damaged at the rotating speed of approximately 80,000 r.p.m, because of relatively poor mechanical characteristics of the sintered body in which the fracture toughness ($K_{1c}$) is as small as 4 MPam$^{1/2}$ or lower, and the bending strength is as small as 50 kgf/mm$^2$. Also, in a rotor 10 in which the spinning yarn portion 1 is made of a nitride silicon sintered body having properties outside of the range of the present invention (Nos. 7 through 12 specimens), the rotor failed before reaching the rotating speed of 100,000 r.p.m due to 6 MPam$^{1/2}$ in the fracture toughness ($K_{1c}$) of the sintered body or 60 kgf/m$^2$ or lower in bending strength.

On the other hand, a rotor 10 in which the spinning portion 1 is made of a nitride silicon sintered body of the present invention (Nos. 1 through 6 specimens) did not fail even in the rotation speed of 130,000 r.p.m.

EMBODIMENT 2

Then, the yarn strength was measured when the surface roughness of grooves 8 and the upper, lower inner wall faces 4, 5 for composing the maximum diameter portion 6 of the spinning chamber 3 changed, using the rotor 10 of the present invention of the No. 1 specimen.

As the measuring conditions, the rotor 10 was rotated at the rotating speed of approximately 80,000 r.p.m., with 100% cotton being used for yarn, low count yarn of spinning count $10^3$.

Respective results are shown in Table 2 below.

TABLE 2

| Yarn Strength (g) | | Yarn type: 100% cotton Spinning count: $10^3$ F(μM) | | | |
|---|---|---|---|---|---|
| E(μm) | 0.5 | 0.75 | 1.0 | 1.25 | 1.5 |
| 0.5 | 723 | 715 | 643 | 582 | 575 |
| 0.75 | 710 | 695 | 640 | 580 | 571 |
| 1.0 | 680 | 685 | 630 | 577 | 566 |
| 1.25 | 580 | 575 | 570 | 560 | 558 |
| 1.5 | 555 | 560 | 568 | 550 | 545 |

F: roughness of groove upper face and upper inner wall face
E: roughness of groove lower face and lower inner wall face.

Yarn unevenness of twisted yarn formed by the rotor was also measured. Results of the measurement are shown in Table 3 below.

TABLE 3

| Yarn Unevenness (%) | | Yarn type: 100% cotton Spinning count: $10^3$ F(μm) | |
|---|---|---|---|
| E(μm) | 0.5 | 0.75 | 1.0 |
| 0.5 | 9.7 | 9.9 | 10.0 |
| 0.75 | 10.0 | 9.9 | 10.1 |
| 1.0 | 10.1 | 10.1 | 10.2 |

F: roughness of groove upper face and upper inner wall face
E: roughness of groove lower face and lower inner wall face.

The results in Table 2 show that the yarn strength increased when the surface roughness of the maximum diameter portion 6 was made smooth. Especially, when the central line average roughness (Ra) of the surface of the maximum diameter portion 6 is 1.0 μm or lower, the yarn strength was improved considerably, and even exceeded the yarn strength (600 g) of the twisted yarn obtained by the conventional metallic rotor 10.

Also, the yarn unevenness of the twisted yarn 22 extracted by the rotor 10 was measured. When the central line average roughness (Ra) of the surface of the maximum diameter portion 6 is 1.0 μm or lower, the yarn unevenness (10.5%) of twisted yarn that may be obtained by the conventional rotor 10 and lower yarn unevenness were achieved as shown in table 3.

It was discovered from the above that, when the central line average roughness of the surfaces of the grooves 8 and the upper and lower inner wall faces 4, 5 of the maximum diameter portion 6 of the spinning chamber 3 is 1.0 μm or lower, the quality of yarn (yarn strength and yarn unevenness) was better. In other words, in this range of the central line average roughness (Ra), the yarn quality (yarn strength and yarn unevenness) is higher as compared with the conventional ones.

EMBODIMENT 3

Further, different weights are attached to the rotor 10 of the present invention having the No. 1 specimen to change the unbalance amount. The temperature of the rotor 10 with each of the weights attached thereto was measured when the rotor 10 was rotated at high speeds.

In the present experiment, weights were respectively attached to a portion A and a portion B of the spinning portion 1 shown in FIG. 2 to change the unbalance amount. After rotating each rotor 10 at 130,000 r.p.m. for ten minutes, the temperature of the rotary shaft 9 was measured with a contact type thermometer. The temperature of the rotor 10 at 80° C. or lower is considered to be superior.

Respective results are shown in Table 4 below.

TABLE 4

| Unbalance Amount on B face (mgm) | Unbalance Amount on A Face (mgm) | | | | |
|---|---|---|---|---|---|
| | 0.10 | 0.15 | 0.20 | 0.25 | 0.30 |
| 0.10 | 72° C. | 79° C. | 85° C. | 94° C. | 121° C. |
| 0.15 | 78° C. | 80° C. | 92° C. | 110° C. | 135° C. |
| 0.20 | 83° C. | 86° C. | 108° C. | 124° C. | 142° C. |
| 0.25 | 92° C. | 96° C. | 122° C. | 146° C. | 159° C. |
| 0.30 | 117° C. | 126° C. | 141° C. | 157° C. | 169° C. |

The results show that the vibration of the rotor 10 becomes larger, as the unbalance amount becomes larger, and the temperature of the rotary shaft 9 becomes also higher.

The temperature of the rotary shaft 9 is maintained at 80° C. or lower when the unbalance amount of both the portion A and the portion B of the spinning portion 1 is 0.15 mgm or lower.

When the rotor 10 is provided with a spinning portion 1 made of a nitride silicon sintered body, it was found from the results shown above that, when the maximum unbalance amount is controlled to be under 0.15 mgm or lower, melting abrasion of the driving belt (not shown) and strength deterioration of the rotary shaft 9 are prevented, and the stable high speed rotation of the rotor 10 is obtained.

With a rotor in accordance with an embodiment of the present invention described above, the yarn strength and the yarn quality do not reduce even after the rotor is used for a long period of time, because the high speed rotation of 100,000 r.p.m. or more cannot damage the spinning portion, and the surface of the maximum diameter portion is hard to be roughened. In the present invention, the spinning portion of a rotor for an open-end spinning machine is made of a nitride silicon sintered body including nitride silicon grains with not less than 60% of the nitride silicon grains having an aspect ratio of 3 or more, with the average crystal grain size being 0.1 through 10 μm. The rotor is composed of a bottomed cylindrical body and a rotary shaft connected to the bottomed cylindrical body. The bottomed cylindrical body includes a hollow portion defining a spinning chamber. The bottomed cylindrical body forms twisted yarn by focussing short fiber groups toward the maximum diameter portion of the spinning chamber, and continuously twisting the short fiber groups.

Also, the present invention improves the quality of yarn. When the central line average roughness (Ra) of the surface of the maximum diameter portion of the spinning portion is 1 μm or lower, the yarn strength is considerably improved.

Further, in the present invention, stable high speed rotation can be effected for a long period of time without reduction in service life of the rotary shaft and the driving belt with an unbalance amount of the rotor being 0.15 mgm.

We claim:

1. A rotor for open-end spinning machine for forming twisted yarn from short fiber groups, comprising:

a spinning portion having a substantially cylindrical body, the cylindrical body having a hollow portion defining a spinning chamber, the spinning chamber having a maximum diameter portion, wherein the twisted yarn is formed by gathering short fiber groups in the maximum diameter portion of the spinning chamber and continuously twisting the short fiber groups by a continuous twisting operation of the spinning chamber, and a rotary shaft joined to the spinning portion, the spinning portion comprising a silicon nitride sintered body comprising silicon nitride grains having an average grain size of between 0.1 μm and 10 μm, not less than 60% of said silicon nitride grains having an aspect ratio of not less than about 3.

2. A rotor for an open-end spinning machine according to claim 1, wherein the maximum diameter portion of the spinning portion has a central line average roughness (Ra) of not greater than about 1 μm.

3. A rotor for an open-end spinning machine according to claim 1 or claim 5, where the rotor has a maximum unbalance not greater than about 15 mgm.

4. A rotor for an open-end spinning machine according to claim 1, wherein the silicon nitride sintered body includes 90 through 96% by weight silicon nitride powder.

5. A rotor for an open-end spinning machine according to claim 4, wherein the silicon nitride sintered body comprises an assistant of $Al_2O_3$ and a rare earth oxide selected from a group of $Y_2O_3$ and $Yb_2O_3$.

6. A rotor for open-end spinning machine for forming twisted yarn from short fiber groups, comprising:

a spinning portion having a substantially cylindrical body, the cylindrical body having a hollow portion defining a spinning chamber, the spinning chamber having a tapered wall, an opening at one end of the tapered wall and a maximum diameter portion formed at a distance from the opening; and a rotary shaft joined to the spinning portion;

the spinning portion comprising a silicon nitride sintered body comprising an assistant of $Al_2O_3$ and a rare earth oxide selected from a group of $Y_2O_3$ and $Yb_2O_3$, the silicon nitride sintered body comprising silicon nitride grains having an average grain size of between 0.1 μm and 10 μm and having a bending strength not less than 60 kgf/mm² and a breakdown tenacity value of not less than 6 MPam$^{1/2}$.

7. A rotor for an open-end spinning machine according to claim 6, wherein not less than 60% of said silicon nitride grains has an aspect ratio of not less than about 3.

8. A rotor for an open-end spinning machine according to claim 7, wherein the maximum diameter portion of the spinning portion has a central line average roughness of no more than 1 μm.

9. A rotor for an open-end spinning machine according to claim 7, wherein the spinning portion has a maximum unbalance of no more than 15 mgm.

10. A rotor for an open-end spinning machine according to claim 6, wherein the maximum diameter portion of the spinning portion has a central line average roughness of no more than 1 μm.

11. A rotor for an open-end spinning machine according to claim 6, wherein the spinning portion has a maximum unbalance of no more than 15 mgm.

* * * * *